(12) United States Patent
Imberg

(10) Patent No.: US 6,560,444 B1
(45) Date of Patent: May 6, 2003

(54) ANTENNA SWITCH MODULE

(75) Inventor: Bengt Ulrik Imberg, Uppsala (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/467,672

(22) Filed: Dec. 21, 1999

(30) Foreign Application Priority Data

Dec. 22, 1998 (SE) ................................. 9804506

(51) Int. Cl.[7] ............................. H04B 1/44; H01P 1/00
(52) U.S. Cl. ............................ 455/78; 455/82; 455/83; 333/245
(58) Field of Search ............................ 455/78, 80, 82, 455/83, 84, 553, 180.1, 188.1, 77, 81, 563; 333/245, 101, 108

(56) References Cited

U.S. PATENT DOCUMENTS 4,940,984 A * 7/1990 Kleiber ..................... 342/173
5,513,382 A * 4/1996 Agahi-Kesheh et al. ...... 455/83
5,789,995 A  8/1998 Minasi
6,021,318 A * 2/2000 Schaffer ..................... 455/78
6,075,979 A * 6/2000 Holtvoeth et al. ........... 455/264
6,393,260 B1 * 5/2002 Murtojarvi et al. ......... 455/305

FOREIGN PATENT DOCUMENTS

EP          101531      2/1984
JP          01-029130   1/1989

* cited by examiner

Primary Examiner—Edward F. Urban
Assistant Examiner—S. Smith
(74) Attorney, Agent, or Firm—Burns, Doane, Swecker & Mathis, L.L.P.

(57) ABSTRACT

A switching circuit connects transceivers for different frequencies alternatively to a common antenna. The circuit including a plurality of sets, each including a plurality of PIN diodes connected in series, and the PIN diodes in a set may be activated by a DC current, which DC current is led through a bias resistor, creating a bias voltage. This bias voltage is used for reverse biasing the PIN diodes in another set, thus eliminating quiescent PIN diodes therein from creating spurious signals. The circuit is particularly suited for cellular mobile telephones using two frequency bands.

4 Claims, 3 Drawing Sheets

ANTENNA SWITCH MODULE

BACKGROUND

The present invention regards a switching circuit having a plurality of sets of switchable transceiver terminals for connecting individually to a common antenna, each set comprising a plurality of PIN diodes and a DC network for applying switching bias voltage from a DC source for connecting a selected one of said sets to said common antenna and for disconnecting non-selected sets from said antenna.

The invention is in particular directed to problems appearing in mobile telephones using two different frequency bands, for example the EGSM 900 system and the GSM 1800 system. The invention is, however, not limited to this use or even to the use in cellular telephony.

A switching circuit is known from Japanese no. 01-029130, where two transmitters having a common antenna are mutually isolated by means of PIN diodes. On the other hand, there is no question of transceivers in this publication, the receiver function not being covered.

SUMMARY

It is an object of the present invention to obtain a switching circuit of the kind recited above, and where reverse bias can be arranged with few components and without the necessity of an auxilliary polarity source.

It is another object to prevent harmonic generation in inactive branches of a multi-band PIN diode antenna switch. This problem of harmonic generation is particularly acute in the case where one frequency band has twice the frequency of the other, such that e.g. the first overtone of the lower frequency falls within the band of the higher frequency. Thus, even if the transmitters are connected to the antenna via the respective terminals of a duplex filter, a sufficient proportion of the transmitter signal may reach the other(s), where the respective fast PIN diodes if unbiased will be able to create spurious overtones which are sent back and may reach the antenna.

A forward biasing in both branches of a two-band system, thus avoiding quiescent PIN diodes creating spurious signals, might work if there are two different transmitter power amplifiers and only one of them is activated at the same time. For mobile units, where size and weight are kept low, it is sometimes advantageous to have only one power amplifier having two outputs and arranged for feeding transmitter energy in either frequency band. Then, the power amplifier as working on the lower frequency will still output some harmonics or spurious signals at awkward frequencies. It is therefore another object of the invention to obtain clean transmitting signals without harmonic distorsions.

The said objects are satisfied, according to the present invention, by arranging in a switching circuit as recited such that at least two PIN diodes belonging to the same set are connected in series and similarly directed, that the DC network therof is connected for enabling a forward current through said PIN diodes of the set, that all said DC networks have a common DC terminal which is connectable via a bias resistor to a terminal of a DC source having the opposite polarity relative to said switching bias voltage, and whereby activating by a forward bias current in one of said DC networks will create a bias voltage in said bias resistor when connected, for reverse biasing the PIN diodes of a set not so activated.

Although any number of transceiver devices may be arranged switchable, preferable through multiplex filters, to a common antenna, the invention is particularly useful in a cellular mobile telephone arranged for communication in alternative frequency bands, like the EGSM 900 (880–915 and 925–960 Mhz for transmitting and receiving respectively) and the GSM 1800 (1710–1785 and 1805–1880 Mhz for transmitting and receiving respectively). Similar problems exist in other communications systems.

In an advantageous embodiment, the high-frequency components, including a diplex antenna filter, of the switching circuit are arranged in a sole modular component, which may be mounted on a printed circuit board, the components for DC biasing arranged around on that board. The modular component can then be made to exacting tolerances as demanded in microwave equipment.

By setting adequate bias voltages, it is then possible to connect each transmitter to the antenna under disconnecting the other(s), and to disconnect all transmitters while connecting the respective receiver terminals to the antenna. Thus, in the case of a double transceiver band embodiment, the bias setting may have at least three different states, namely, a first state for enabling a first set for transmitting in a first frequency band and deactivating a second set by reverse biasing its PIN diodes, a second state for enabling the second set for transmitting in a second frequency band and deactivating the first set by reverse biasing its PIN diodes, and a third state where the PIN diodes in both sets are reverse biased, and where receiver terminals are connected to the respective terminals of the duplex filter.

BRIEF DESCRIPTION OF THE DRAWING

The invention shall now be further explained by reference to the figures.

DETAILED DESCRIPTION

Figure 1:
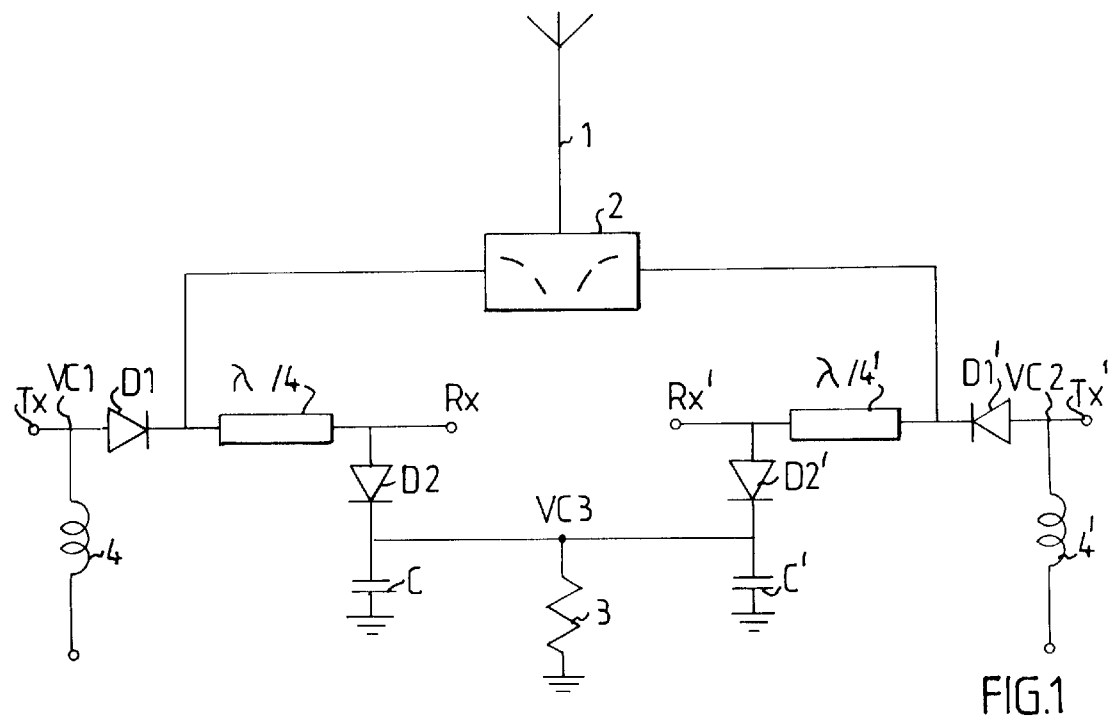
FIG. 1 shows a diagram of a two-branch antenna switch module.

FIG. 1 shows very schematically an embodiment of the invention, for connecting alternative transmitter powers Tx, Tx' to an antenna 1 via a diplex filter 2. The embodiment is highly symmetric, having two substantially similar branches, although constructed for different frequency bands. The left branch has, for instance, counted from the left, a transmitter terminal Tx, a first PIN diode D1, a $\lambda/4$ line, a second PIN diode D2, a capacitor C and an earth point. The point between the first diode D1 and the $\lambda/4$ line is connected to a terminal of the diplex filter 2. The point between the $\lambda/4$ line and the second PIN diode is connected to a receiver terminal RX. The left branch is similar, the details of which bearing a prime sign. At least the $\lambda/4$ lines and the branches of the duplex filter are specially dimensioned for the respective frequency bands.

DC biasing is arranged in the points VC1 and VC2 coinciding with the respective transmitter terminals and in a point VC3 connecting the respective points between the diodes D1, D2 and the capacitors C, C'. In this explanatory drawing, the point VC3 is connected by resistor 3 to earth.

If now the point VC1 is put at a positive potential, by connecting via inductance 4, this current will forward bias the PIN diodes D1 and D2 and create a voltage drop over resistance 3. If, then, VC2 is earthed via inductance 4', the diodes D1' and D2' will be reverse biased. A transmitter frequency applied to the Tx terminal will then see the near end of the λ/4 line as infinity and connect with low loss to the diplex filter 2 and the antenna 1. Any signal passing through the diplex filter 2 to the other branch will then be sufficiently attenuated by the filter so that it is unable to switch the reverse biased PIN diodes D1' and D2'. Analogously, if the point VC1 is earthed and VC2 is put at a positive potential, a transmitter frequency applied to the TX' terminal will reach the antenna, and the left branch will not give rise to spurious overtones.

By reverse biasing both branches, an advantageous isolation from the transmitters is obtained for utilising the receiving terminals Rx and Rx' respectively. On the other hand, the standby condition for a cellular phone includes listening on Rx and/or Rx', whereas the transmitter sources are silent. The biasing of the PIN diodes will indeed take some current, although small, and it may therefore be preferred to remove the biasing currents in silent periods of this standby mode.

The reverse biasing through the voltage drop over resistor 3 is a fraction of the available battery voltage in a mobile phone, normally about half this voltage. This means that there must not be transmitted an undamped signal from a transmitting side to an untransmitting side, as the PIN diodes, which act like fast-acting current-controlled resistors, may start to create the kind of signals which the present invention is directed to eliminate.

The PIN diodes shown in the diagrams are connected with anodes and cathodes in a certain direction, consistent with a minus earthed battery. With an oppositely directed battery, the diodes would have to be directed oppositely.

Figure 2:
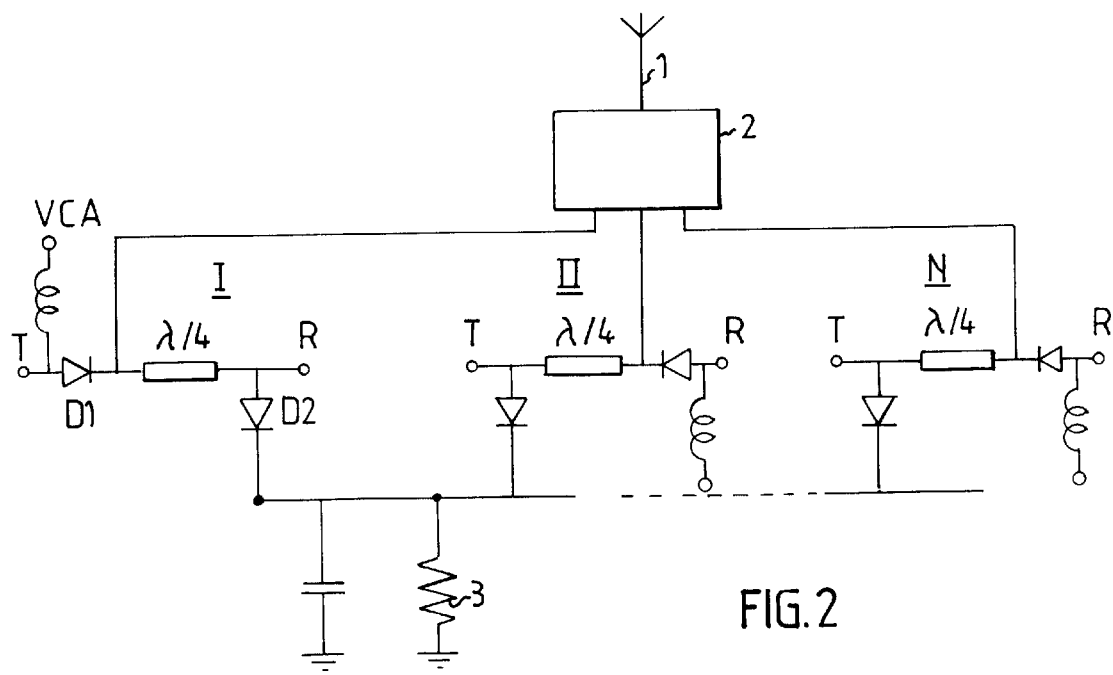
FIG. 2 shows a general antenna switch module with a plurality of brances.

FIG. 2 shows a case where several transmitters are connected to a common antenna, and where PIN diodes in non-active branches are reverse biased by means of the voltage drop over a resistor 3, conducting the forward bias current of an active branch. As the principle is common to FIG. 1, no further explanation is needed.

Figure 3:
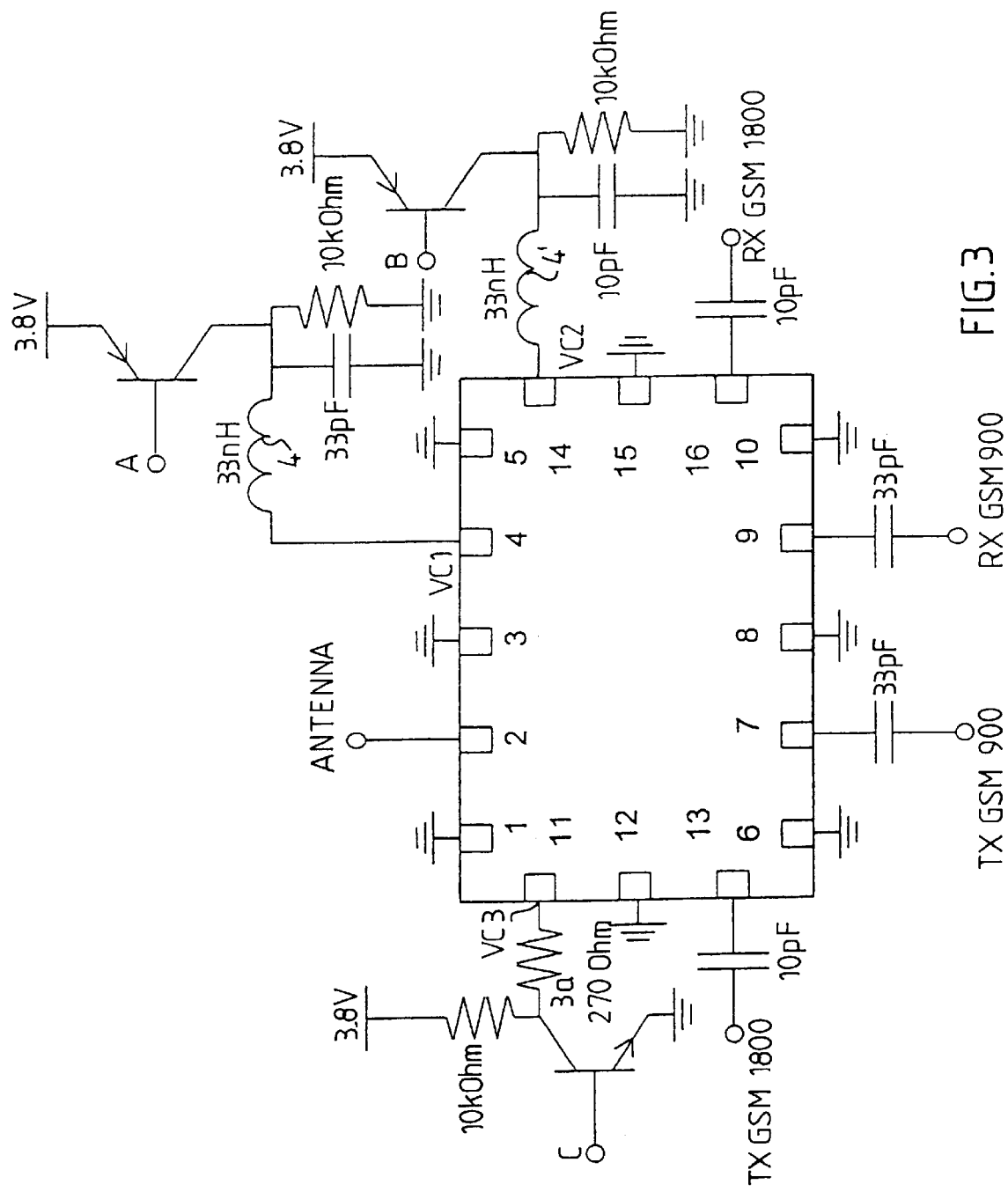
FIG. 3 shows a more detailed application with its DC biasing system.

FIG. 3 shows an embodiment where the high-frequency components of FIG. 1 are arranged in a sole component made in a multilayer ceramic technique, DC components for the biasing purposes being arranged around. Points VC1, VC2. VC3 correspond to terminals on the component, whereas resistor 3a in FIG. 3 corresponds to resistor 3 in FIG. 1. The diplex filter corresponding to diplex filter 2 in FIG. 1 (not shown) consists of a high-pass LC filter connecting the antenna with the higher frequency Tx terminal, and a low-pass LC filter connecting the antenna with the lower frequency TX terminal.

Multilayer ceramic technique components are commercially available and may comprise various components in the layers, as striplines, resistors, buried capacitors, connections in holes connecting adjacent layers, etc. An example of a source for such devices is muRata Electronics, of Kanalgatan 10 C, 194 61 Upplands Väsby, Sweden.

The voltage at point VC3 is obtained through the voltage drop over resistor 3a corresponding to resistor 3 in FIG. 1. This current may come from VC1 or from VC2 as previously explained. As apparent from FIG. 3; the levels of VC1, VC2 and VC3 are set by setting the terminals A, B and C high or low, which are connected to bases of transistors. Setting A and B respectively to low will connect inductance 4 or 4' respectively to forward current,whereas their setting to high will earth the respective inductances.

Setting A high, B low and C high will thus make a low-loss connection between the TX GSM 1800 terminal and the antenna via a high-pass filter in the diplex filter (not shown in this figure), and eliminate signals from the other branch connected to the TX EGSM 900 terminal. Setting A low, B high and C high will make a low-loss connection between the TX EGSM 900 terminal and the antenna via a low-pass filter in the diplex filter (not shown) and eliminate signals from the other branch connected to the TX GSM 1800 terminal.

If C is set low and both A and B are set high, the PIN diodes on both sides will be reverse biased. As understood from a glance at FIG. 1, both TX and TX' will then be isolated from the antenna, whereas the RX terminals will be low-loss connected to the antenna. As this state consumes at least some current, it may be avoided for non-transmitting standby conditions, which are thus at least in principle better served with no bias currents at all.

Figure 4:
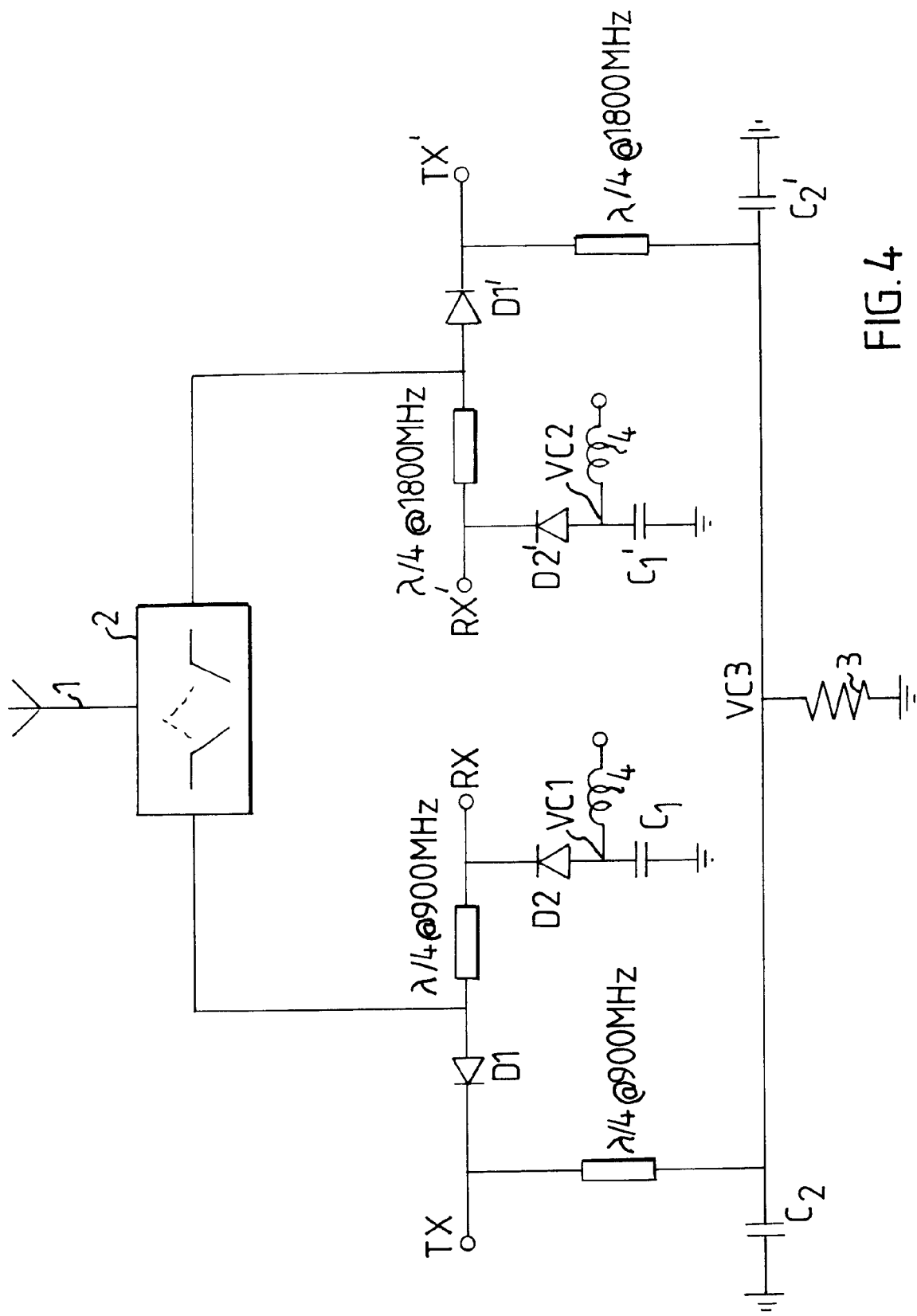
FIG. 4 shows an exemplary diagram similar to FIG. 1, but where the PIN diodes have opposite anode-cathode directions.

As has already been inferred, the PIN diodes do not have to be connected as in FIG. 1, that is, toward AC common/ earth, even with a minus-earthed battery. In FIG. 4 is shown an example where biasing is obtained by means of a bias resistor 3 connected to a terminal of a DC source, but where the the PIN diodes are oppositely directed. Nevertheless, the voltage source used has negative earth. The forward current in FIG. 4 must thus be activated by a positive voltage applied at the anode of D2 (or D2') and pass through D2 (or D2'), the λ/4 lead and D1(or D1'), and further through the bias resistor 3.

Inorder to bring this about, the DC must be led to VC3, in FIG. 4 via a further λ/4 lead, which will lead the current but will be seen by TX (or TX') as infinity.

In the FIG. 4 embodiment, the point VC3 no longer coincides as to DC with the cathodes of D2 and D2' as in the embodiment of FIG. 1, and the point VC3 must therefore be separately AC decoupled, as by capacitors C2, C2', which may be combined into a common capacitor (not shown).

Although the invention has been exemplified in detail only for the case of mobile systems using two transceiver frequency bands, the man of the art will understand that the principles of the invention may be brought to use in other connexions, and that the invention is defined and limited only by the claims.

What is claimed is:

1. A switching circuit having a plurality of sets of switchable transceiver terminals for connecting individually to a common antenna, each set comprising a plurality of PIN diodes and a DC network for applying switching bias voltage from a DC source for connecting a selected one of said sets to said common antenna and for disconnecting non-selected sets from said antenna, wherein in each set, at least two said PIN diodes belonging to the same set are connected in series and similarly directed, the DC network thereof is connected for applying a bias voltage enabling a forward current through said PIN diodes of that set, all said DC networks have a common DC terminal which is connectable via a bias resistor to a terminal of a DC source having the opposite polarity relative to said switching bias voltage, and activating a set by a forward current in one of said DC networks creates a further bias voltage in said bias resistor when connected, for enabling reverse biasing of PIN diodes belonging to sets not provided with a forward-current enabling bias voltage, wherein each set is connected in series a transmitter terminal, a first PIN diode, a quarter-wave lead, a second PIN diode, a capacitor and an earth connection, a receiver terminal being connected between the quarter-wave lead and the second PIN diode and an antenna lead connected between the first PIN diode and the quarter-wave lead, the DC network comprising an activation terminal, an inductance having a first end connected to the activation terminal and a second end connectable to a voltage source, and wherein a second quarter-wave lead is connected between said transmitter terminal and said common terminal, and said activation terminal is connected to a point between said capacitor and said first PIN diode.

2. A switching circuit according to claim 1, wherein said common terminal is connected to a point between said second PIN diode and said capacitor, and the activation terminal is connected to a point between said first PIN diode and said transmitter terminal.

3. A switching circuit according to claim 1, wherein the switching circuit contains two said sets, provided for a 900 MHz and a 1800 MHz cellular telephone system frequency band, respectively, and a diplex filter having an antenna terminal and two transmitter terminals connected respectively to the antenna leads of the sets.

4. A switching circuit according to claim 1, wherein high-frequency components thereof are arranged in a common multilayer circuit module, and DC biasing components are mounted on a printed circuit together with the said multilayer circuit module.

* * * * *